No. 883,432. PATENTED MAR. 31, 1908.
A. E. TRAEGER.
TOASTER.
APPLICATION FILED APR. 29, 1907.

Witnesses:
Richard Sommer
Gustav W. Hora

Augustus E. Traeger,
Inventor
by Geyer & Papp
Attorneys.

UNITED STATES PATENT OFFICE.

AUGUSTUS E. TRAEGER, OF BUFFALO, NEW YORK, ASSIGNOR TO A. E. TRAEGER SPECIALTY MANUFACTURING COMPANY, OF BUFFALO, NEW YORK, A CORPORATION OF NEW YORK.

TOASTER.

No. 883,432.　　　　　Specification of Letters Patent.　　Patented March 31, 1908.

Application filed April 29, 1907. Serial No. 370,918.

*To all whom it may concern:*

Be it known that I, AUGUSTUS E. TRAEGER, a citizen of the United States, residing at Buffalo, in the county of Erie and State of New York, have invented a new and useful Improvement in Toasters, of which the following is a specification.

One of the objects of my invention is the production of a toaster or broiler which protects the toast or other article from contact with the flame of the stove or heater and prevents exposure of the same to the gases or odors of the fuel and which at the same time retains a considerable portion of the moisture present in the bread, thus preserving the original taste and flavor of the toasted or broiled article.

A further object is to provide the utensil with supports which keep the pieces to be toasted out of contact with the sides of the toasting receptacle, preventing burning of their edges.

Further objects are to so construct the toaster that it can be readily reversed for exposing both sides of the articles to the heat; to provide it with simple means for observing the condition of the toast without opening the utensil, and to provide its handles with simple means for interlocking them.

Figure 1:
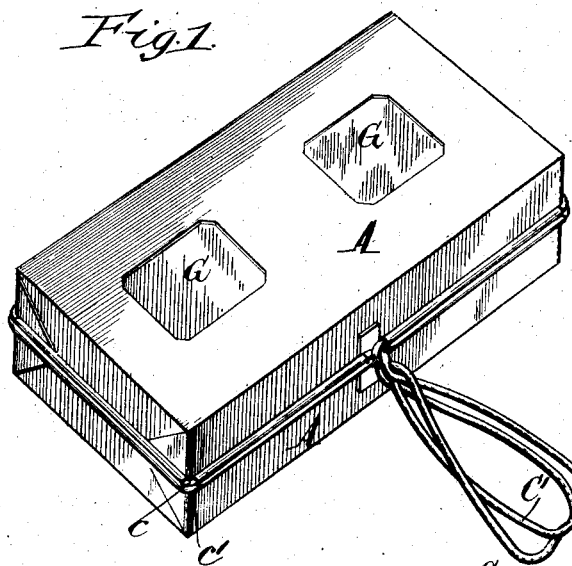
Figure 3:
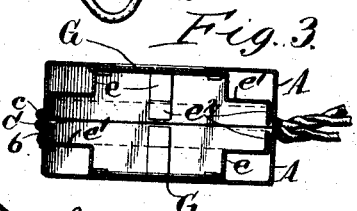
Figure 2:
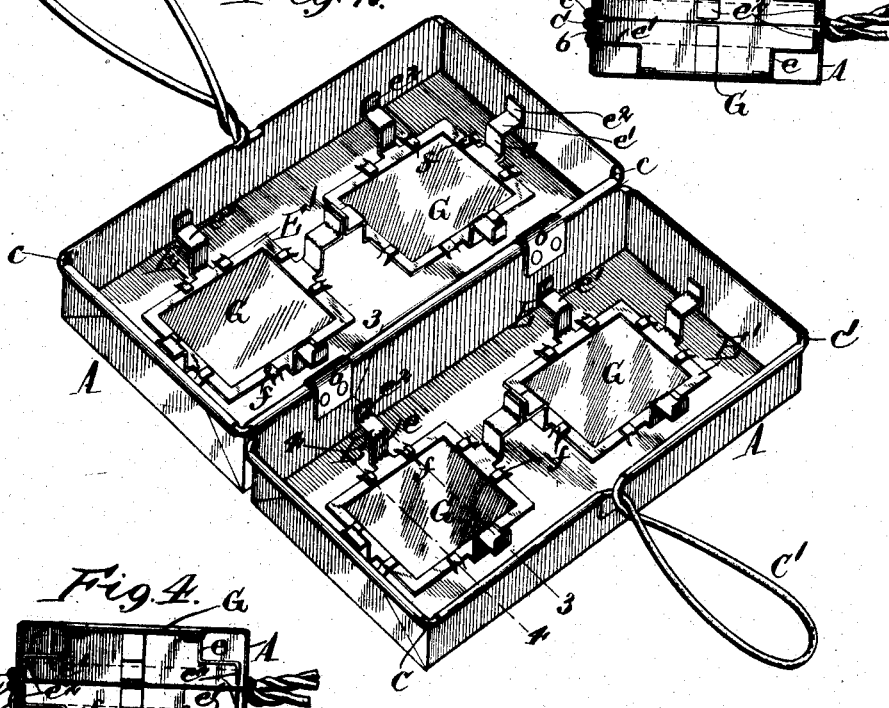
Figure 4:

In the accompanying drawings: Figure 1 is a perspective view of the toaster as it appears when closed or folded. Fig. 2 is a similar view, showing the toaster open or unfolded. Figs. 3 and 4 are cross sections in the correspondingly-numbered lines in Fig. 2.

Similar letters of reference indicate corresponding parts throughout the several views.

The toaster consists of a pair of imperforate pans or pan-like receptacles A, A, of like dimensions, constructed of sheet metal or other suitable material. They are of oblong or other appropriate form and hinged or otherwise pivotally connected together at adjacent edges, as shown at $b$, so that they can be folded or closed face to face to form a closed toasting chamber or receptacle, as shown in Figs. 1, 3 and 4, or opened as shown in Fig. 2, to receive the pieces of bread or other articles to be toasted or broiled.

At the sides opposite their hinges, the pans are provided with suitable forwardly-extending handles C, $C^1$ which coincide or overlap each other in the closed position of the pans, so that they can both be grasped by the same hand for manipulating the toaster, as required. These handles preferably consist of wire loops forming continuations of wires $c$, $c^1$ which bound and stiffen the upper edges of the pans, as shown, and if desired, these loops may be provided with means for interlocking them. In the construction illustrated in the drawings, the loop C is wider than the loop $C^1$, to admit the latter between its side bars, and this wide loop is provided centrally at its outer end with an inward bend or lip $d$ adapted to be sprung under the rounded outer end of the other loop $C^1$, as shown in Fig. 1, thereby retaining the narrow loop within the wide one and locking the two pans in their closed position. The loops have sufficient elasticity for this purpose. They are readily disconnected by applying the necessary force to spring the lip of the wide loop from under the end of the narrow loop.

Within each of the pans are arranged suitable supports E for sustaining the pieces of bread or other articles to be toasted out of contact with the bottom of the pans. In the preferred construction shown in the drawings, each pan is provided with two sets of such supports, each set consisting of four or more supports which are adapted to sustain a single piece of bread. The four supports constituting a set are formed integral with an open rectangular frame $E^1$ of sheet metal which is secured to the bottom of the pan, preferably by lips $f$ stamped up from the bottom and overlapping the frame. Each support consists of a strip bent upwardly from the edge of the supporting frame $E^1$ at right angles to the bottom of the pan to form a standard $e$, thence outwardly parallel with the bottom to form a bread-seat $e^1$, and thence upwardly to form a lip or stop $e^2$ at the outer edge of the seat. The supports E of each set are properly spaced to receive a piece of bread of ordinary size and confine it against displacement. The supports of one pan are arranged to come directly opposite those of the other pan when the toaster is closed, as shown in Figs. 3 and 4, so that the pieces of bread are confined between the opposing supports of the two pans, the bread being indicated by dotted lines in said figures. As shown in the drawings, the supports are arranged at a distance from the walls of the pans to keep the toast out of contact with the latter and avoid burning it. By stamping or otherwise forming each set of supports E in one piece with their carrying frame E¹, the construction of these parts is rendered simple and inexpensive.

To permit inspection of the toast from time to time without opening the pans, the latter are provided in their bottoms with one or more windows G of mica or other suitable material. These mica panes are applied to the inner sides of the pans and confined between the bottoms of the latter and the rectangular frames E¹. The latter thus perform the double function of a carrier for the supports E and a clamping frame for the corresponding mica sheet.

In the use of the utensil, the pieces of bread to be toasted are placed on the seats $e^1$ of one of the pans and the latter are then folded and their handles interlocked, completely inclosing the bread. The toast is thus not only protected against burning by contact with the flame of the gas burner or other heater, but much of the moisture in the bread is retained and exposure of the toast to the products of combustion is avoided, rendering it very palatable. As gases and odors cannot enter the toaster, the bread may be toasted over any kind of heater, including lamps and oil stoves, without danger of burning the toast or affecting its taste.

I claim as my invention:

1. A toaster comprising a pair of pans hinged together at one edge and provided at their opposite free edges with wire handle-loops, one of the loops being wider than the other and provided at its outer end with a lip or bend arranged to interlock with the adjacent end of the other loop, substantially as set forth.

2. In a toaster, a pan having opposing bread-supports each consisting of a seat raised above the bottom of the pan and provided with a stop for preventing displacement of the bread on the seat, substantially as set forth.

3. In a toaster, a pan having opposing bread-supports each consisting of a standard rising from the bottom of the pan, a substantially horizontal seat at the upper end of the standard and a stop arranged on the seat, substantially as set forth.

4. In a toaster, the combination of a pan, a sheet-metal frame or plate secured to the interior of the pan-bottom and bread-supports formed integral with said frame and each comprising a strip bent upward from the frame substantially at right angles to the pan bottom, thence outward to form a seat and thence upward to form a stop, substantially as set forth.

5. A toaster, comprising a pair of connected pans having sight-openings covered by transparent panes and containing bread-supports raised above the bottoms of the pans, substantially as set forth.

6. A toaster, comprising a pair of connected pans having sight-openings, open frames coinciding with said openings and secured to the interior of the pan-bottoms, bread-supports formed integral with said frames, and transparent panes covering said sight-openings and interposed between the pan-bottoms and said frames, substantially as set forth.

7. A toaster, comprising a pair of connected pans having sight openings, transparent panes covering said openings, the bottoms of the pans having integral lips for retaining said panes in place thereon, and raised bread supports arranged in the pans adjacent to the edges of said sight-openings, substantially as set forth.

Witness my hand this 24th day of April, 1907.

AUGUSTUS E. TRAEGER.

Witnesses:
  C. F. GEYER,
  E. M. GRAHAM